United States Patent [19]

Hosoya et al.

[11] Patent Number: 4,559,558
[45] Date of Patent: Dec. 17, 1985

[54] PICTURE QUALITY ADJUSTING CIRCUIT

[75] Inventors: Mitsuru Hosoya; Takao Tsuchiya, both of Fujisawa; Naokuni Toyoda, Tokyo, all of Japan

[73] Assignee: Sony Corporation, Tokyo, Japan

[21] Appl. No.: 413,378

[22] PCT Filed: Dec. 25, 1981

[86] PCT No.: PCT/JP81/00408
§ 371 Date: Aug. 24, 1982
§ 102(e) Date: Aug. 24, 1982

[87] PCT Pub. No.: WO82/02312
PCT Pub. Date: Jul. 8, 1982

[30] Foreign Application Priority Data
Dec. 26, 1980 [JP] Japan .................................. 55-186495

[51] Int. Cl.[4] .............................................. H04N 5/14
[52] U.S. Cl. ..................... 358/162; 358/166

[58] Field of Search ................... 358/36, 37, 162, 166, 358/167, 169

[56] References Cited
U.S. PATENT DOCUMENTS

| 3,838,598 | 10/1974 | Okada | 358/162 |
| 3,946,153 | 3/1976 | Peth | 358/162 |
| 3,984,865 | 10/1976 | Avins | 358/167 |
| 4,263,616 | 4/1981 | Lee | 358/166 |
| 4,410,912 | 10/1983 | Hess | 358/162 |
| 4,414,564 | 11/1983 | Hitchcock | 358/166 |

Primary Examiner—Tommy P. Chin
Attorney, Agent, or Firm—Lewis H. Eslinger; Alvin Sinderbrand

[57] ABSTRACT

In order to improve picture quality, an input video signal is added to a correcting signal which is formed by the secondary differentiation of the input video signal. White peak current is reduced so that white blur is avoided without adversely affecting the picture quality on the black side.

4 Claims, 19 Drawing Figures

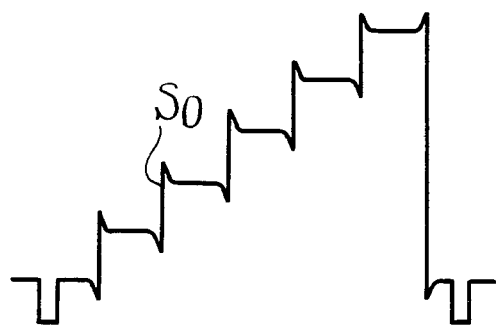
F I G. 1A
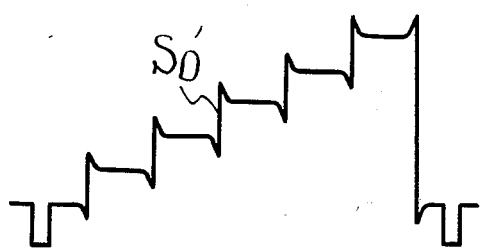
F I G. 1B
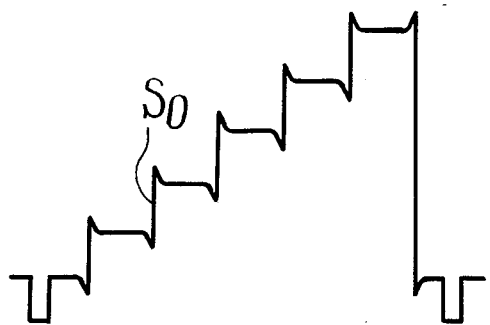
F I G. 2A
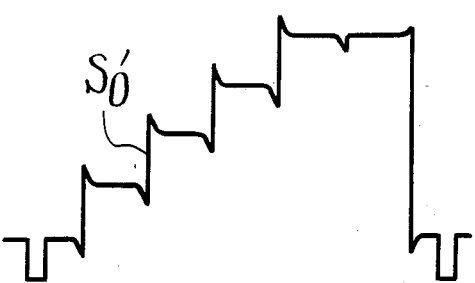
F I G. 2B

FIG. 6A ($S_i$) 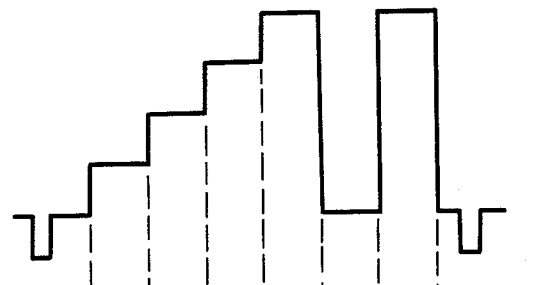
FIG. 6B ($S_1$) 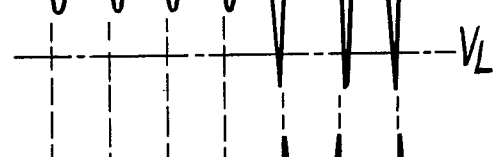
FIG. 6C ($S_3$) 
FIG. 6D ($S_0$) 
FIG. 6E ($S_0'$) 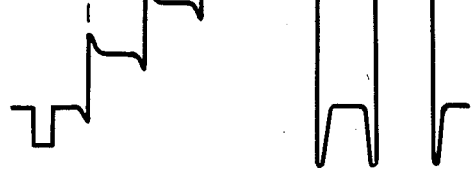

PICTURE QUALITY ADJUSTING CIRCUIT

TECHNICAL FIELD

The present invention relates to a picture quality adjusting circuit, in which an input video signal is added with a correcting signal for sharpness improving formed by the secondary-differentiation or the like of the input video signal to prevent the picture quality from being deteriorated mainly by the spot size of an electron beam being enlarged.

BACKGROUND ART

There has been well known such a picture quality adjusting circuit that upon transmitting a video signal, a correcting signal provided by secondary-differentiating an input video signal was superimposed upon the input video signal so as to improve the sharpness of a picture. However, when such a video signal in which a video signal with a large amplitude is superimposed thereon with a correcting signal having a relatively large level is produced from the conventional picture quality adjusting circuit, and a Braun-tube is driven by this signal, such a problem is brought about that the spot size of the electron beam is enlarged by a white peak with a value larger than a specified value and fine portions of the picture are damaged to cause white blurs thus resulting in picture degradation.

In order to prevent the picture quality from being deteriorated by the spot size of the electron beam enlarged, there may be considered two methods. One method is such that the white peak of the video signal applied to the Braun-tube can be detected and when the white peak is detected, the amplitude of the video signal is made low. Such circuit is called a peak ABL (automatic beam current limiter), in which a video signal $S_0$ shown in FIG. 1A is converted into a video signal $S_0'$ shown in FIG. 1B. The other method is such that the white peak of a video signal can be similarly detected and when the white peak of the video signal shown in FIG. 2A is detected, the white side thereof is clipped or compressed thereby converted into a video signal $S_0'$ shown in FIG. 2B.

But, the former method has such problems that the circuit arrangement thereof is made complex, and when the white peak is detected, the contrast of the picture is lost suddenly. Whereas, the latter method inherits such a defect that as will be clear from FIG. 2B, the information on the white portion is likely to be lost.

An object of the present invention is to provide a picture quality adjusting circuit which can avoid white blurs caused by the spot size of the electron beam being enlarged.

DISCLOSURE OF INVENTION

Based upon the fact that since a video signal component with a large amplitude per se has sufficient contrast, it requires not so much improvements of sharpness of picture, the present invention is to provide such a picture quality adjusting circuit that the correcting amount of the white side for the video signal component with large amplitude is suppressed more as compared with the correcting amount of the black side, whereby the white blur is not caused, and the video signal with small amplitude or medium amplitude can be corrected sufficiently. In addition, the picture quality adjusting circuit according to the present invention has an advantage that its circuit arrangement is simplified.

Moreover, in accordance with the present invention, by a simple arrangement with a provision of a large amplitude white side suppressing circuit, it is possible to prevent the white peak from being protruded by the correcting signal component thus the white blur being avoided. Furthermore, the correcting signal for the white peak portion is suppressed so that the picture quality on the black side can be prevented from being deteriorated. In other words, in the case of the video signal which rises from the black level to the white side, the correcting signal on the black side becomes less than the cut-off level so that effect of the improvement of sharpness is not achieved. But, in the case of the video signal with large amplitude which rises from a background of a level on a somewhat white side rather than the black level (dark grey), the sharpness of the black portion can be improved by the black side correcting signal. Furthermore, if the present invention is applied to a television receiver having the peak ABL circuit for restricting the beam current when the white peak is detected, the peak ABL operation is effected by the white peak correcting signal so as to prevent the contrast from being varied. According to the present invention, it is needless to say that the white peak current can be reduced and hence loads on the Braun-tube and the deflection system can be reduced.

BRIEF DESCRIPTION OF DRAWINGS

FIGS. 1A to B and 2A to B are waveform diagrams used to explain a prior art picture quality adjusting circuit, FIGS. 6A to E, 7A to C and 8 are waveform diagrams each used to explain the operation of the present invention.

BEST MODE FOR CARRYING OUT THE INVENTION

Hereinafter, one embodiment of this invention will be described with reference to FIG. 3.

Figure 3:
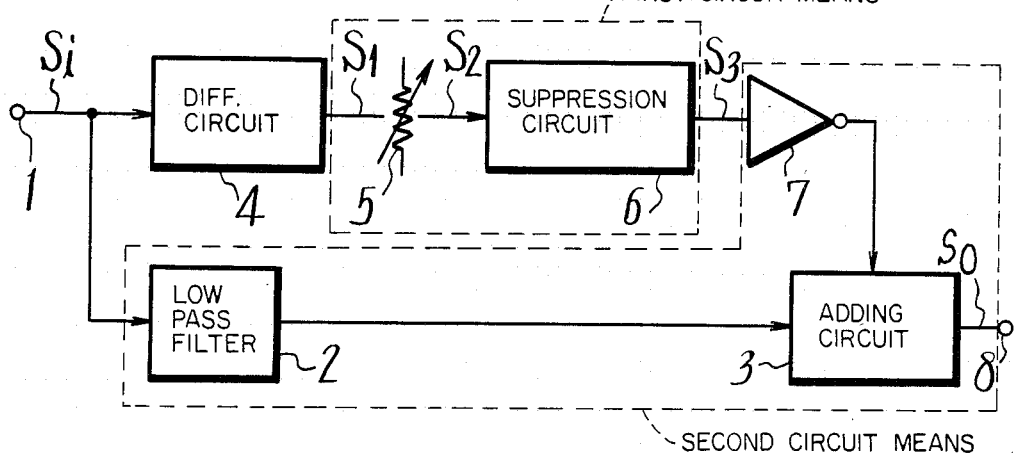
FIG. 3 is a block diagram of one embodiment according to the present invention.

In FIG. 3, an input terminal denoted by reference numeral 1 is supplied with an input video signal $S_i$. The input video signal $S_i$ is supplied through a low pass filter 2 (not necessarily provided) to an adding circuit 3 and a secondary differentiating circuit 4. This secondary differentiating circuit 4 is arranged such that the input video signal $S_i$ is differentiated once, and the differentiated output thereof is further differentiated. At the output thereof appears a correcting signal $S_1$ for sharpness improving. In order to form the correcting signal $S_1$, a waveform generating circuit other than the secondary differentiating circuit may be used. The correcting signal $S_1$ is supplied to a level adjusting means 5 such as a potentiometer or the like. A correcting signal $S_2$ from this level adjusting means 5 is supplied to a large amplitude white side suppressing circuit 6 which produces at its output a correcting signal $S_3$ where the large amplitude component on the white side of the correcting signal $S_2$ is suppressed. This correcting signal $S_3$ is supplied to the adding circuit 3 by way of an inverting circuit 7. This adding circuit 3 produces at its output terminal 8 an output video signal $S_0$ on which the correcting signal is superimposed.

Figure 4:
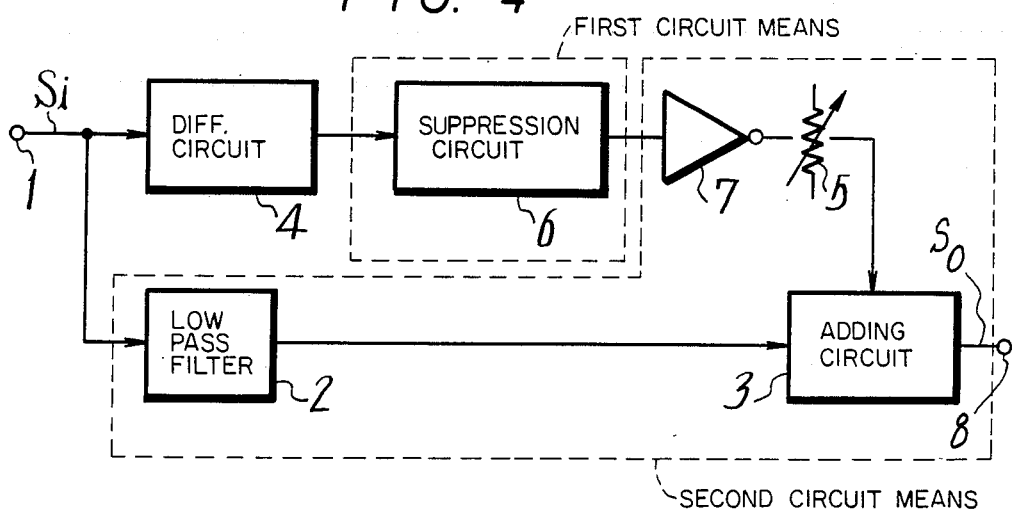
FIG. 4 is a block diagram of another embodiment according to the present invention.

As shown in FIG. 4, the level adjusting means 5 may be connected to the following stage of the large amplitude white side suppressing circuit 6 as in the stage between the inverting circuit 7 and the adding circuit 3.

Figure 5:
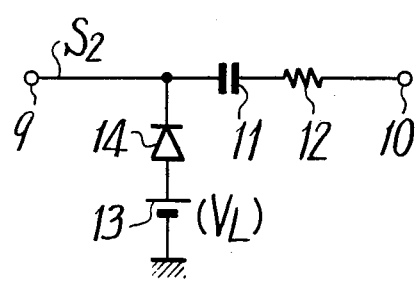
FIG. 5 is a connection diagram showing one example of a large amplitude white side suppressing circuit.

The large amplitude white side suppressing circuit 6 is of a limiter circuit as, for example, shown in FIG. 5. Between an input terminal 9 supplied from the level adjusting means 5 with the correcting signal $S_2$ and an output terminal 10 is connected a series circuit formed of a capacitor 11 and a resistor 12, while between the connection point of the input terminal 9 with the capacitor 11 and the ground are connected a voltage source 13 and a diode 14. Since in this embodiment, the white side of the correcting signal $S_2$ is made at lower side than a predetermined DC potential which is taken as a reference, the large amplitude component on the white side smaller than a limiter level $V_L$ made by the voltage source 13 (strictly speaking, a value in which this limiter level $V_L$ is added with a forward voltage drop across the diode 14) does not appear at the output terminal 10.

If the input terminal 1 in one embodiment according to the present invention is supplied with an input video signal $S_i$ as, for example, shown in FIG. 6A, a correcting signal $S_1$ shown in FIG. 6B is produced from the secondary differentiating circuit 4 and supplied through the level adjusting means 5 to the large amplitude white side suppressing circuit 6 from which is produced a correcting signal $S_3$ in which the white side large amplitude is suppressed less than the limiter level $V_L$ as shown in FIG. 6C. This correcting signal $S_3$ is added to the input video signal $S_i$ by way of the inverting circuit 7, by which at the output terminal 8 appears an output video signal $S_0$ as shown in FIG. 6D.

If the large amplitude white side suppressing circuit 6 is not provided, an output video signal $S_0'$ any one of the black and white sides of which is superimposed thereon with the correcting signal of large amplitude is produced. Therefore, the correcting signal with large amplitude superimposed upon the white side acts to enlarge the spot size of the electron beam resulting in the white blur. However, in accordance with the present invention, this portion is suppressed so that the white blur can be avoided. Moreover, since the large amplitude black side component and other portions which have no fear to reach the white peak are not at all suppressed in level, the effect of the improvement of sharpness can be achieved satisfactorily.

Figure 7A:
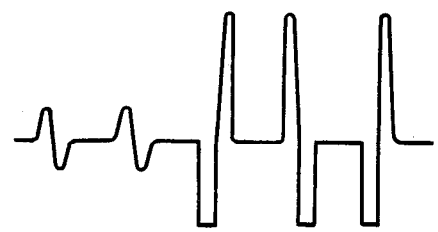
Figure 7B:
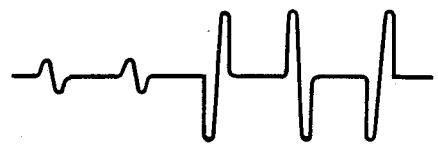
Figure 7C:
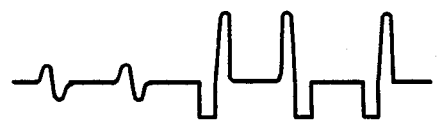

As illustrated in FIG. 4, another embodiment according to the present invention where the arranging position of the level adjusting means 5 is varied is similarly operated as described hereinbefore. In this case, however, the waveform of the correcting signal provided when the adjusting amount done by the level adjusting means 5 is varied is made somewhat different. FIGS. 7 are waveform diagrams used to explain the above. Let us assume that when the correcting amount is maximized by the level adjusting means 5, a correcting signal shown in FIG. 7A is obtained. Then, when in the arrangement shown in FIG. 3 the correcting amount is decreased by the level adjusting means 5 incorporated in first circuit means, the level of the correcting signal does not reach the limiter level $V_L$, so that a correcting signal neither of white side and black side of which is suppressed as shown in FIG. 7B is generated from the large amplitude white side suppressing circuit 6. Whereas, as in the construction shown in FIG. 4, when the level adjusting means 5 is provided in second circuit means at the output side of the large amplitude white side suppressing circuit 6, a correcting signal when the correcting amount is decreased becomes in waveform shown in FIG. 7C where the amplitude of the correcting signal shown in FIG. 7A is made smaller. In this case, the correcting amount of the white side is liable to be locked.

Figure 8:
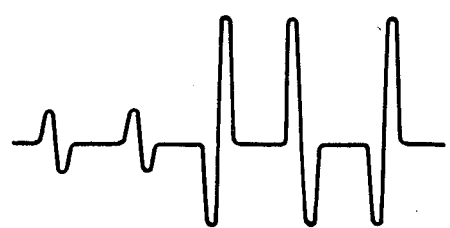

Furthermore, other than the limiter circuit, the large amplitude white side suppressing circuit 6 can utilize an asymmetrical amplifier which has the function to clip the white side at a predetermined level and a predetermined gain for the black side. The waveform of the correcting signal when the asymmetrical amplifier is used becomes as shown in FIG. 8.

Figure 9:
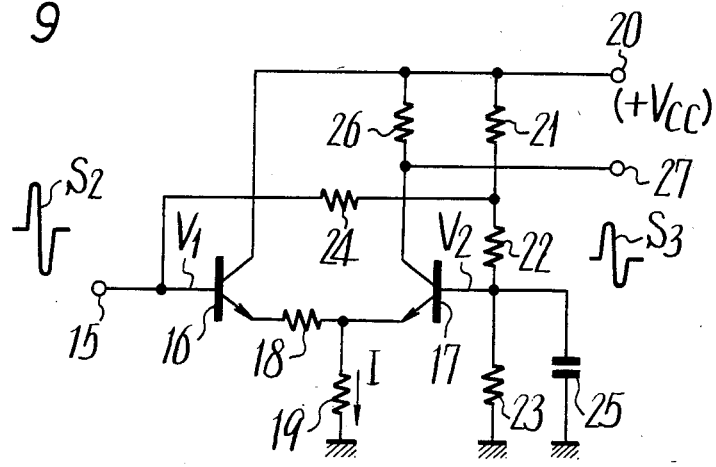
FIG. 9 is a connection diagram showing another example of the large amplitude white side suppressing circuit.

One example of the asymmetrical amplifier is illustrated in FIG. 9. There are provided a transistor 16 whose base is connected to an input terminal 15 which is supplied with the correcting signal $S_2$ through the level adjusting means 5 and a transistor 17 whose emitter is connected to the emitter of the transistor 16 by way of a resistor 18, where between the connection point of the emitter of the transistor 17 with the resistor 18 and the ground is connected a resistor 19 which permits a constant current I to flow therethrough. Between a power source terminal 20 and the ground is inserted a series connection of resistors 21, 22 and 23, the connection point between the resistors 21 and 22 is connected to the base of the transistor 16 by way of a resistor 24, the connection point between the resistors 22 and 23 is connected to the base of the transistor 17, and between the connection point of the resistors 22 and 23 and the ground is further connected a capacitor 25. The collector of the transistor 17 is connected to the power source terminal 20 by way of a load resistor 26, and then led out as an output terminal 27.

With the aforesaid arrangement, an operation will be first described under such assumption that the base voltage of the transistor 16 is taken as $V_1$, the base voltage of the transistor 17 is taken as $V_2$, and for the sake of simplicity the resistor 22 is $0\Omega$ or not connected. When $V_1 = V_2$ is established, the emitter voltages of the transistors 16 and 17 become substantially equal with each other so that almost no current is flowed through the resistor 18. Thus the transistor 16 is made OFF, while the transistor 17 is made ON. When $V_1 < V_2$ is established, the current is not flowed through the resistor 18 thereby making the transistor 16 cut off. When $V_1 > V_2$ is established, the emitter voltage of the transistor 16 becomes higher than the emitter voltage of the transistor 17, so that the current is flowed through the resistor 18 to make the transistor 16 ON. When $V_1 - V_2 = R_{18} \times I/2$ ($R_{18}$ represents the value of the resistor 18 and I represents the constant current flowing through the resistor 19) is established, the currents flowing through the transistors 16 and 17 become equal to each other. The base voltage $V_2$ of the transistor 17 is determined by the ratio among the resistors 21, 22 and 23, which is selected to be equal to the DC level of the input correcting signal $S_2$. As described above, if the value of the resistor 22 is assumed as $0\Omega$, all of the correcting signals on the white side with the levels smaller than the level of $V_2$ are clipped. Therefore, the resistor 22 having the proper value corresponding to the clipping level is connected.

Figure 10:
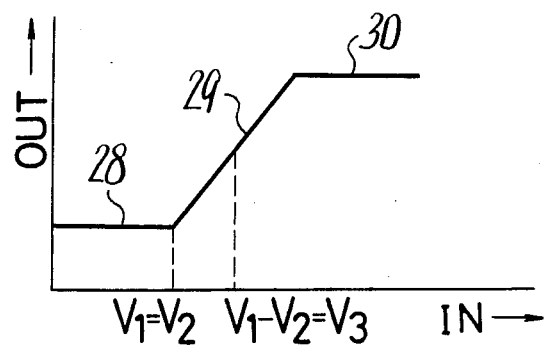
FIG. 10 is a graph used to explain the input-to-output characteristics thereof.

Accordingly, when the resistor 22 is not connected to the asymmetrical amplifier shown in FIG. 9, it presents input-to-output characteristics which consist of, as shown in FIG. 10 a partial characteristic 28 where the constant output is obtained at the side to satisfy $V_1 < V_2$ while $V_1 = V_2$ is taken as the boundary, a partial characteristic 29 in which the output level proportional to the input level at the side to satisfy $V_1 > V_2$ and which is symmetrical with respect to $V_1 - V_2 = V_3 = R_{18} \times I/2$, and a partial characteristic 30 where the output level is saturated. Then, the provision of the resistor 22 deviates the operating point to the right direction in FIG. 10 so that even if $V_1 < V_2$ is established, the correcting signal is not clipped up to the predetermined input level.

Figure 11:
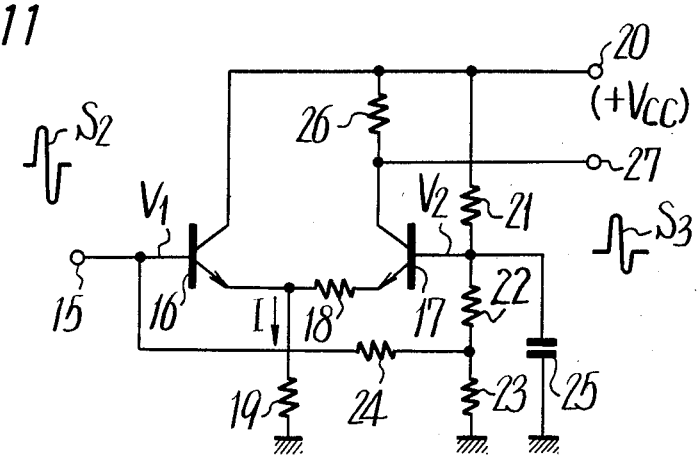
FIG. 11 is a connection diagram showing other example of the large amplitude white side suppressing circuit.

While the afore-mentioned embodiments are applied to such a case where in the correcting signal, its side more than the predetermined DC level is black and its side less than the same is white, the present invention can also be applied to such a case that the above relation is reversed. FIG. 11 shows an asymmetrical amplifier which is applied to the case that in the correcting signal, its side more than the predetermined DC level is white and its side less than the same is black. Between the power source terminal 20 and the ground is connected a series connection of the resistors 21, 22 and 23, the base of the transistor 17 is connected to the connection point between the resistors 21 and 22, and the base of the transistor 16 is connected to the connection point between the resistors 22 and 23 by way of the resistor 24. The operation thereof is similar to the aforementioned one.

We claim:

1. Video picture quality adjusting apparatus comprising:

means for twice differentiating an input video signal to form a correcting signal, first circuit means responsive to said correcting signal and including suppression means for limiting the maximum amplitude of said correcting signal to produce a modified correcting signal, and second circuit means jointly responsive to said modified correcting signal and said input video signal to produce a corrected output video signal;

wherein said suppression means comprises an input terminal, capacitor means, resistor means and an output terminal in series with each other, and a DC voltage source and diode means in series with each other and in parallel with said resistor means and capacitor means, whereby said diode means becomes conductive when the voltage of said correcting signal bears a predetermined relationship to that of said voltage source.

2. Apparatus according to claim 1 wherein said first circuit means further comprises level adjusting means responsive to said correcting signal for producing a level-adjusted signal, said suppression means being responsive to said level-adjusted signal to produce said modified correcting signal.

3. Apparatus according to claim 1 wherein said second circuit means further comprises inverter means for inverting said modified correcting signal to produce an inverted output signal, low pass filter means responsive to said input video signal to produce a filtered video signal, and adder means jointly responsive to said inverted output signal and said filtered video signal for producing said corrected output video signal.

4. Apparatus according to claim 1 wherein said second circuit means further comprises inverter means for inverting said modified correcting signal to produce an inverted output signal, level adjusting means responsive to said inverted output signal for producing a level-adjusted inverted signal, low pass filter means responsive to said input video signal to produce a filtered video signal, and adder means jointly responsive to said level-adjusted inverted signal and said filtered video signal for producing said corrected output video signal.

* * * * *